Figure 1:
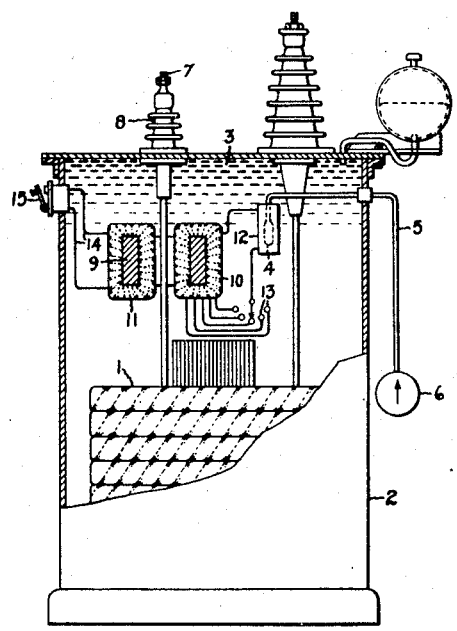

Jan. 27, 1948.  G. CAMILLI  2,435,070

TEMPERATURE INDICATOR CONTROL CIRCUIT

Filed Jan. 5, 1945

Inventor:
Guglielmo Camilli,
by Harry E. Dunham
His Attorney.

Patented Jan. 27, 1948

2,435,070

UNITED STATES PATENT OFFICE 2,435,070

TEMPERATURE INDICATOR CONTROL CIRCUIT

Guglielmo Camilli, Pittsfield, Mass., assignor to General Electric Company, a corporation of New York Application January 5, 1945, Serial No. 571,495

2 Claims. (Cl. 73—350)

This invention relates to electric circuits and more particularly to three-winding transformer circuits.

In its at present preferred form the invention is an improvement on my Patent 2,026,375, granted December 31, 1935, on an application filed May 27, 1935, and assigned to the assignee of this application. That patent relates to a temperature indicator for liquid immersed electric apparatus, such as transformers. It is a so-called hot-spot winding temperature indicator in which the temperature responsive element of the indicator is immersed in the transformer insulating and cooling fluid, and a resistance heater which is energized in proportion to the transformer current is mounted in the vicinity of the temperature responsive element so that the temperature, and consequently the reading of the indicator, is raised above the temperature of the liquid. This is because the hottest part of the transformer is usually a part of one of the windings as heat is generated in these windings by reason of their losses and this heat is transferred to the liquid and finally dissipated through the enclosing casing. A current transformer is used to energize the heater in proportion to the transformer current, and in order to make it possible to have the same indicator give an indication of the liquid temperature when desired, instead of the hot-spot temperature, a switch is provided for short circuiting the secondary winding of the current transformer. The current transformer, the resistance heater and the temperature responsive element of the indicator are all mounted inside the transformer casing but the short circuiting switch is mounted outside of the casing so that it can easily be operated.

One of the drawbacks of the above-described indicator is that the only way it is possible to determine whether the setting of the indicator is correct is to make a heat run on the transformer because the only way to energize the resistance heater is by energizing the main power transformer.

In accordance with this invention a three-winding current transformer is employed and the short circuiting switch is connected across the terminals of the third or tertiary winding on the current transformer. This tertiary winding is designed to have such an equivalent per unit impedance that when it is short circuited the resulting $I^2R$ heating effect in the resistance heater becomes negligible and therefore the indicator reads essentially the temperature of the liquid in which it is immersed. By "equivalent impedance" is meant the impedance of the winding when the three-winding transformer is represented by its equivalent Y circuit diagram, and by "per unit impedance" is meant that the impedances of the various windings of the transformer are all referred to a common base or common circuit, such as a common volt-ampere or ampere-turn base or to either the primary, secondary or tertiary circuit. The tertiary winding, in addition to performing the function of reducing the current in the secondary winding when desired, also is used as an exciting winding. Thus, when it is energized so as to have the same ampere-turns that the primary winding would have if the transformer were energized under, say, full load, the setting of the temperature indicator can be tested without actually passing current through the main power transformer, that is to say, without making a heat run on the main transformer.

An object of the invention is to provide a new and improved electric circuit.

Another object of the invention is to provide a new and improved three-winding transformer circuit.

A further object of the invention is to provide a new and improved temperature indicator system.

The invention will be better understood from the following description taken in connection with the accompanying drawing and its scope will be pointed out in the appended claims.

Figure 2:
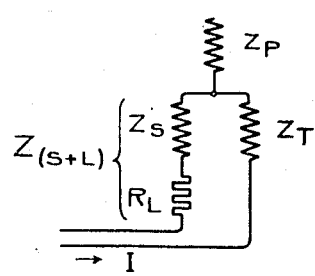
Figure 3:
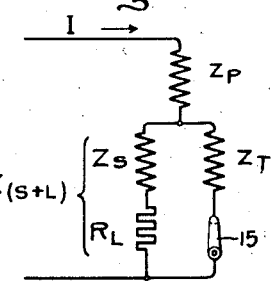

In the drawing Fig. 1 illustrates diagrammatically an embodiment of the invention, and Figs. 2 and 3 are equivalent circuits for explaining the action of the invention under different operating conditions.

Referring now to the drawing, and more particularly to Fig. 1, there is shown therein a main transformer 1 which is inside of an enclosing casing 2 which contains a cooling and insulating liquid 3 in which the transformer is immersed. A temperature indicator of any suitable type is provided. This may consist, by way of example, of a container 4 immersed in the fluid 3. Container 4 may be filled with a thermally expansible liquid and the variations in pressure of this liquid with variations in temperature of the fluid 3 are transmitted through a capillary tube 5 to an indicator in the form of a pressure gauge 6 on the outside of the container 2. One of the external circuit connections to the transformer 1 is made through a conductor 7 which is insulated by means of a bushing 8. Associated with the conductor 7 is a current transformer which may be of the through or bushing type in which the conductor 7 forms the primary winding. This current transformer has a ring-shaped magnetic core 9 which surrounds the conductor 7 and on which are wound a secondary winding 10 and a tertiary winding 11, thus constituting a three-winding transformer.

The load on the secondary winding 10 consists of a resistance heater 12 in the form of a conducting tube which surrounds the thermal element 4, the opposite ends of the tube 12 being connected to the respective terminals of the secondary winding 10. This winding is preferably provided with taps 13 so that the ratio of the current transformer can be adjusted when making the factory setting of the temperature indicator so that the latter will truly indicate the hot-spot winding temperature.

The tertiary winding 11 is connected by means of leads 14 to the terminals of a switch 15 which when closed short circuits the tertiary winding 11. When this switch is open the terminals of the switch can be connected to a source of current supply for circulating current in the tertiary winding 11.

The operation of the illustrated embodiment of the invention is as follows: By means of a heat run on the power transformer 1 (or on a similar unit) and calculations of its hot-spot temperature the difference between the temperature of the liquid 3 and the hot-spot temperature of the transformer is determined and then the resistance heater 12 is connected across the proper tap 13 so that the reading of the indicator 6 is increased by the same number of degrees above the liquid temperature. After the transformer has been completely assembled and all of its various auxiliaries have been installed it is necessary to make a final check in order to determine whether the setting of the temperature indicator is correct. This is done by energizing the tertiary winding 11 through the leads 14 so that it has the same number of ampere-turns as the primary winding or conductor 7 when the transformer is carrying a predetermined current, such as rated current. Consequently, the secondary winding and the resistance heater 12 will be energized in exactly the same way as though the transformer were carrying rated current and thus the setting of the temperature indicator can be checked without actually making a heat run on the power transformer.

The equivalent Y circuit of the three-winding current transformer when connected in the above-described manner is as shown in Fig. 2 in which $Z_P$, $Z_S$ and $Z_T$ are the respective equivalent per unit or percentage impedances of the primary, secondary and tertiary windings. $R_L$ is the resistance of the load on the secondary winding; that is to say, the resistance of the resistance heater 12 and $Z_{(S+L)}$ is the equivalent per unit impedance of the secondary winding and its load. As the total impedance to current flow through the transformer is the impedance of the tertiary winding and the secondary winding plus its load, the equivalent circuit consists of the series connection of the tertiary winding, the secondary winding and the load on the secondary winding through which the current I is passed, this current I being the current which is equivalent to, say, rated current in the primary winding of the current transformer.

If now the tertiary winding 11 is de-energized and the short circuiting switch 15 is closed when the power transformer is carrying current, then the equivalent circuit is as shown in Fig. 3 in which the equivalent impedance $Z_T$ of the tertiary winding is effectively connected in parallel with the equivalent impedance of the secondary winding and its load, these parallel-connected elements being in series with the equivalent impedance $Z_P$ of the primary winding. Consequently, if the impedance $Z_T$ is equal to $Z_{(S+L)}$, the current I will divide equally between them so that the $I^2R$ heating effect in $R_L$ becomes one-quarter of that which it would be if switch 15 were opened and with the same value I of current flowing through the primary winding. Therefore, by reducing $Z_T$ materially below $Z_S$, the heating effect in the resistance 12 can be made entirely negligible so that the temperature indicator will indicate the liquid temperature and not the hot-spot winding temperature.

Another advantage of the present invention over my above-referred to patent is that in that patent the resistance of the leads for the switch which short circuits the secondary winding may be appreciable compared with the resistance of the heater so that the heating effect of the heater may not be reduced as much as desired, whereas with the present invention the tertiary winding 11 can readily be so designed that when it is short circuited the current in the heater 12 is reduced by any desired percentage.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a liquid-immersed electromagnetic induction apparatus, a thermometer which reads the temperature near the top of the immersing liquid, a current transformer having a primary winding connected to carry the current of said apparatus, means including a secondary winding on said current transformer for supplying local heat to said thermometer in proportion to the current in said apparatus in order to cause said thermometer to indicate the hot-spot temperature of said apparatus, a tertiary winding on said transformer for exciting it during a simulated heat run on said apparatus so as to check the hot-spot temperature setting of said thermometer, and means for selectively short circuiting said tertiary winding, said tertiary winding and its short circuiting connections having a substantially lower equivalent per unit impedance than said secondary winding and its load whereby the short circuiting of said tertiary winding reduces the heat produced by said means including said secondary winding to a negligible value.

2. In combination, a power transformer enclosed in a liquid-filled casing, a thermometer having temperature indicating means outside said casing and temperature responsive actuating means in heat receiving relation with said liquid, a three-winding current transformer having a primary winding connected to carry the current of said power transformer, a resistance heater adjacent said temperature responsive actuating means, a secondary winding on said current transformer connected to energize said heater, a tertiary winding on said current transformer, and means including a switch on the outside of said casing for selectively short circuiting said tertiary winding, said tertiary winding and last-mentioned means having a lower equivalent per unit impedance than said secondary winding and heater.

GUGLIELMO CAMILLI.

REFERENCES CITED

The following references are of record in the file of this patent:

UNITED STATES PATENTS

| Number | Name | Date |
| --- | --- | --- |
| 347,141 | Thomson | Aug. 10, 1886 |